US007882095B2

(12) United States Patent
Gwozdz

(10) Patent No.: US 7,882,095 B2
(45) Date of Patent: Feb. 1, 2011

(54) RESOURCE LOCATORS FOR WIDELY DISTRIBUTED SYSTEMS

(75) Inventor: Daniel Gwozdz, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 11/420,972

(22) Filed: May 30, 2006

(65) Prior Publication Data
US 2007/0282847 A1     Dec. 6, 2007

(51) Int. Cl.
*G06F 17/30* (2006.01)
(52) U.S. Cl. .................................. 707/706; 707/770
(58) Field of Classification Search ................. 707/706, 707/770
See application file for complete search history.

(56) References Cited

U.S. PATENT DOCUMENTS

| 6,026,474 | A | 2/2000 | Carter et al. | |
| 6,058,423 | A | 5/2000 | Factor | |
| 6,064,666 | A | 5/2000 | Willner et al. | |
| 6,256,740 | B1 | 7/2001 | Muller et al. | |
| 6,338,059 | B1* | 1/2002 | Fields et al. | 715/208 |
| 6,430,563 | B1* | 8/2002 | Fritz et al. | 707/694 |
| 6,493,702 | B1* | 12/2002 | Adar et al. | 707/706 |
| 6,578,069 | B1 | 6/2003 | Hopmann et al. | |
| 6,601,057 | B1* | 7/2003 | Underwood et al. | 715/207 |
| 6,651,066 | B2* | 11/2003 | Baxter et al. | 707/741 |
| 6,658,417 | B1 | 12/2003 | Stakutis et al. | |
| 6,694,317 | B1 | 2/2004 | Stakutis et al. | |
| 6,697,821 | B2* | 2/2004 | Ziff et al. | 707/706 |
| 6,712,702 | B2 | 3/2004 | Goldberg et al. | |
| 6,785,688 | B2* | 8/2004 | Abajian et al. | 707/700 |
| 6,836,768 | B1* | 12/2004 | Hirsch | 715/225 |
| 6,836,774 | B2* | 12/2004 | Melbin | 709/217 |
| 6,842,789 | B1 | 1/2005 | Nazari | |
| 6,915,303 | B2* | 7/2005 | Kauffman | 707/706 |
| 6,952,717 | B1 | 10/2005 | Monchilovich et al. | |
| 7,010,557 | B2 | 3/2006 | Wang | |
| 7,020,646 | B2* | 3/2006 | Brexel et al. | 707/770 |
| 7,031,954 | B1* | 4/2006 | Kirsch | 707/731 |

(Continued)

OTHER PUBLICATIONS

Czajkowski et al., "Grid Information Services for Distributed Resource Sharing" Available at http://csd12.computer.org/persagen/DLAbsToc.jsp?resourcePath=/dl/proceedings/&toc=comp/proceedings/hpdc/2001/1296/00/1296toc.xml&DOI=10.1109/HPDC.2001.945188.
Pearlman et al., "A Community Authorization Service for Group Collaboration" http://ieeexplore.ieee.org/iel5/7903/21795/01011293.pdf?isNumber.
Wang et al., "Operating System Level Support for Resource Sharing Across Multiple Domains" Available at http://csdl2.computer.org/persagen/DLAbsToc.jsp?resourcePath=/dl/proceedings/&toc=comp/proceedings/hpcasia/2005/2486/00/2486toc.xml&DOI=10.1109/HPCASIA.2005.59.

* cited by examiner

*Primary Examiner*—Don Wong
*Assistant Examiner*—Kim T Nguyen
(74) *Attorney, Agent, or Firm*—Lee & Hayes, PLLC

(57) ABSTRACT

Methods and systems provide simple syndication, browsing, searching, and subscribing solutions to networks of friends. In at least some embodiments, the approaches utilize standard HTTP protocols for consumption, subscription, and interaction of data while using the local file system for publication. The inventive approach overlays a URL address space that can be handled and routed interchangeably between multiple clients and servers or "locations". In this manner, generated requests for user published content can be satisfied by local caches, servers, or peers through, for example, a peer-to-peer network. Accordingly, the inventive solutions provide a platform to make this possible with a simple publishing model that is fully compatible with existing Internet enabled applications.

14 Claims, 4 Drawing Sheets

U.S. PATENT DOCUMENTS

| | | | |
|---|---|---|---|
| 7,031,968 B2 * | 4/2006 | Kremer et al. | 707/706 |
| 2004/0122741 A1 * | 6/2004 | Sidman | 705/26 |
| 2005/0027805 A1 | 2/2005 | Aoki | |
| 2005/0278655 A1 * | 12/2005 | Sims | 715/792 |
| 2006/0053211 A1 | 3/2006 | Kornerup et al. | |
| 2007/0030824 A1 * | 2/2007 | Ribaudo et al. | 370/328 |
| 2007/0244920 A1 * | 10/2007 | Palliyil et al. | 707/102 |

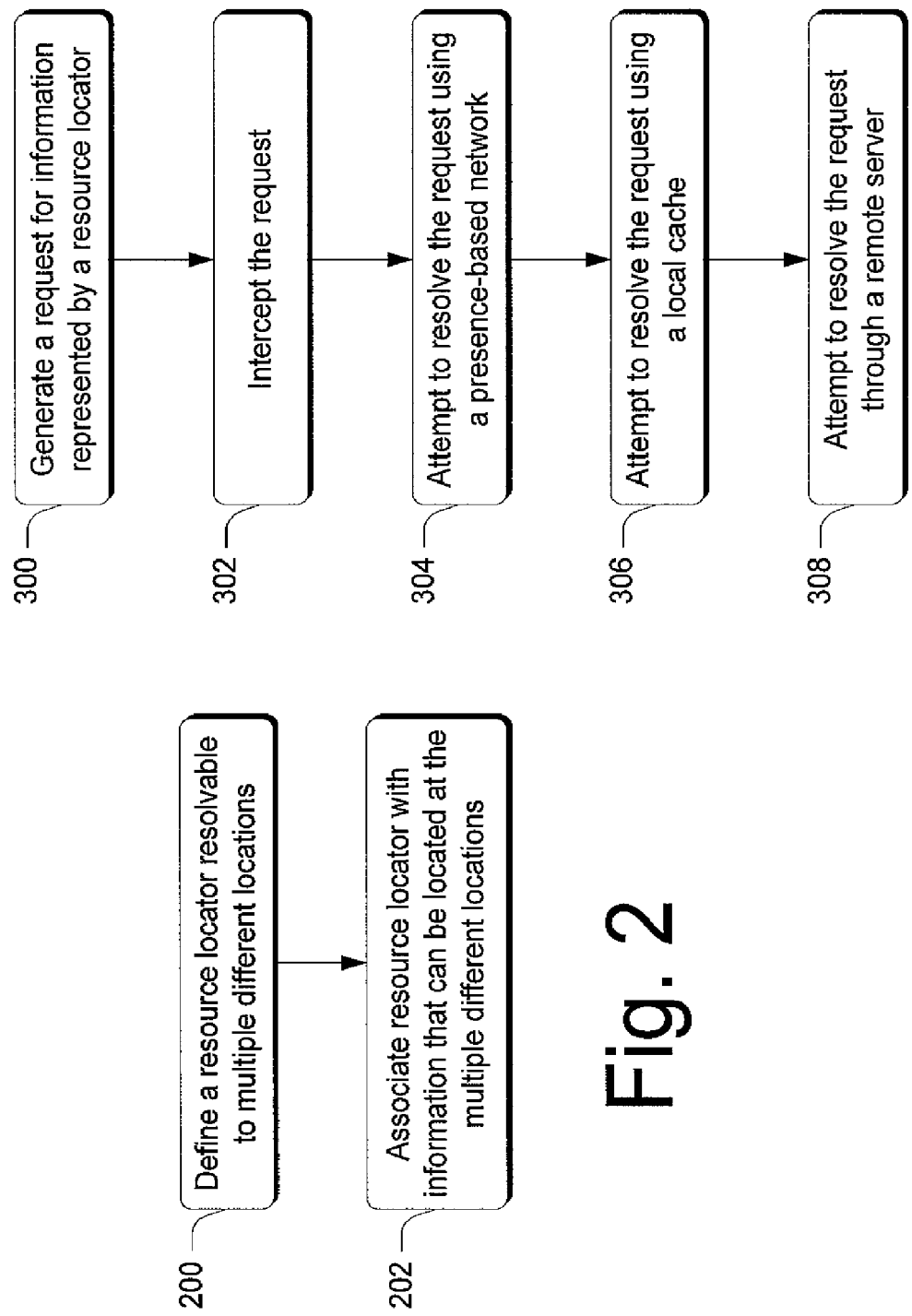

RESOURCE LOCATORS FOR WIDELY DISTRIBUTED SYSTEMS

BACKGROUND

To date, when a user wishes to publish their own content on line for their friends, they face a number of challenges. For example, they may have different kinds of content, such as applications, activities, photos, documents, blogs and the like. Each of these may have their own unique publishing requirements or forums. Many users tend however, to publish their own content to their friends by way of email, as by sending an email with an attachment in the form of the published content. Yet, the email experience in terms of the publishing solution that it provides is not the best technique or solution.

In terms of content consumption, there are a variety of rich solutions that use Internet standards, such as RSS (Really Simple Syndication), to provide a great user experience. Yet, the gap between easy publishing solutions and rich consumption solutions remains to be meaningfully and richly bridged.

SUMMARY

The methods and systems described below provide simple syndication, browsing, searching, and subscribing solutions to networks of friends. In at least some embodiments, the approaches utilize standard HTTP protocols for consumption, subscription, and interaction of data while using the local file system for publication. The inventive approach overlays a resource locator or URL address space that can be handled and routed interchangeably between multiple clients and servers or "locations". In this manner, generated requests for user published content can be satisfied by local caches, servers, or peers through, for example, a peer-to-peer network.

BRIEF DESCRIPTION OF THE DRAWINGS

FIG. 2 is a flow diagram that describes steps in a method in accordance with one embodiment.

FIG. 3 is a flow diagram that describes steps in a method in accordance with one embodiment.

DETAILED DESCRIPTION

Overview

The methods and systems described below provide simple syndication, browsing, searching, and subscribing solutions to networks of friends. In at least some embodiments, the approaches utilize standard HTTP protocols for consumption, subscription, and interaction of data while using the local file system for publication. The inventive approach overlays a resource locator or URL address space that can be handled and resolved interchangeably and routed interchangeably between multiple clients and servers or "locations". In at least some embodiments, the resource locator is resolvable in the traditional manner, but is also capable of being locally intercepted and alternatively resolved. In this manner, generated requests for user published content can be satisfied by local caches, servers, or peers through, for example, a peer-to-peer network. The inventive solutions provide a platform to make this possible with a simple publishing model that is fully compatible with existing Internet enabled applications.

The discussion that follows is structured in the following way. First, a section entitled "Exemplary Environment" provides a description of one environment in which the various embodiments can be employed. Following this, a section entitled "Exemplary Resource Locator" describes characteristics of an exemplary resource locator and gives an example of one. Next, a section entitled "Using the Resource Locator" describes how an application can use the exemplary resource locator. This section includes three sub-sections: "Publishing Content Using the Resource Locator" describes how a user can build an association between their content and the resource locator; "Consuming Content Using the Resource Locator" describes how applications can consume content using the resource locator; and, finally, "End User Scenarios" provides some exemplary end user scenarios in which the exemplary resource locator is employed.

Exemplary Environment

Figure 1:
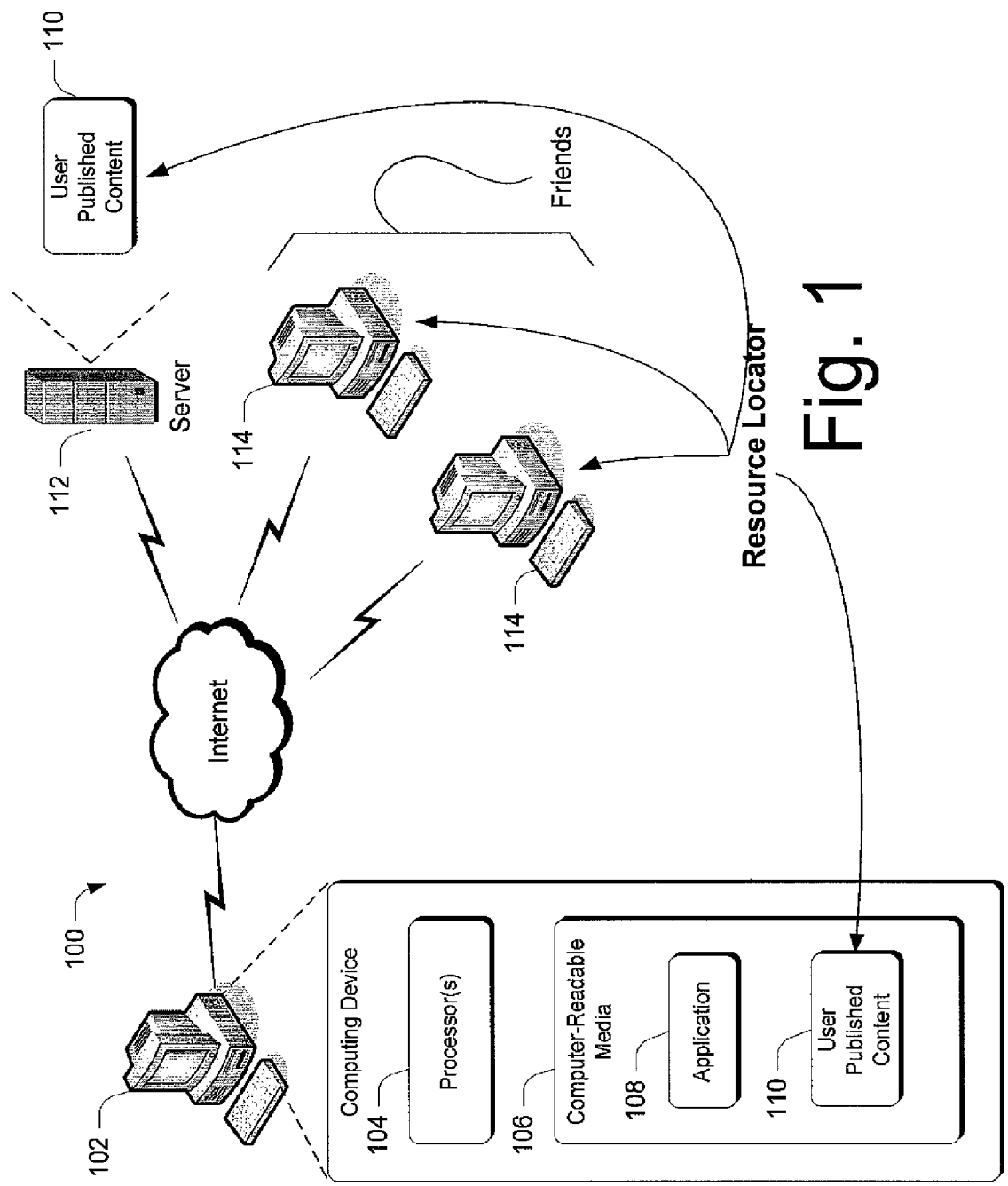
FIG. 1 illustrates an exemplary system in which various embodiments can be employed in accordance with one embodiment.

FIG. 1 illustrates an exemplary environment, in accordance with one embodiment, in which the inventive embodiments can be employed generally at 100.

Here, system 100 includes a client computing device 102 which includes one or more processors 104 and one or more computer-readable media 106 on which executable, computer-readable instructions reside. In this example, computer-readable media 106 includes code that implements one or more applications 108. The various embodiments described below can be implemented by any suitable type of application. In but one example, the inventive embodiments are implemented in connection with an instant messaging application. Microsoft's Live Messenger constitutes but one example of such an application. It is to be understood that other applications can be utilized without departing from the spirit and scope of the claimed subject matter.

Generally, instant messaging applications allow users to instantly communicate and collaborate with what are termed their "contacts" or "buddies"—also referred to as "friends" in this application. A user can build a list of contacts or buddies by providing a friendly name such as "Paul" and an address. Instant messaging applications utilize the notion of "presence", which makes instant communication and collaboration with contacts even more effective. Presence gives users the ability to find each other and stay constantly updated with each other's online status. The powerful capabilities of presence are usually provided through a presence-based network that utilizes one or more servers or services, as will be appreciated by the skilled artisan.

The protocol used for initialization and communication on an instant messaging session depends upon the server or service being used. For example, text can be carried over a TCP connection, a TCP UDP or Secure Sockets Layer (SSL), to name just a few. Typically, an initiating client sends a request to start a conversation with the contact to the server, which is then forwarded to the other client. The instant messaging communication can then proceed. Specifically, message text can now be sent to the server and forwarded to the other client. How the message text is delimited depends upon the server and protocols being used. In some systems, text is sent using a Hypertext Transfer Protocol (HTTP) or Extensible Markup Language (XML) in HTTP message encapsulated in the TCP connection with the server. Other features that instant messaging applications can provide include, by way of example and not limitation, voice and video calls, application sharing and file transfer, all of which will be appreciated by the skilled artisan.

Continuing, computing device 102 also includes user-published content 110 which can include any type of content. For example, such content can include, by way of example and not limitation, a user's pictures or images, favorites (e.g. hyperlinks), lists, ratings, comments, annotations, video, audio, blogs, applications created by the user, daily thoughts and the like. With respect to applications that are published by a user, consider the following.

One of the things that HTTP allows is the sending of verbs such as PUT and GET. In this context, user published content can reside in the form of an application that can execute actions on a remote device using GET or PUT parameters. The inventive embodiments described above and below can allow for remote publishing of content using a PUT verb. Hence, applications running on a remote device (such as WEBDAV applications or a media center control panel) or an application that runs on the requestor's device (such as a web page or an AJAX application) or both (such as an AJAX interactive conversation activity) can be enabled through the use of the inventive embodiments described herein. At least one example of such an application is provided below.

As such and in addition, system 100 includes other locations where the user's published content can reside. For example, such user-published content can reside on a server 112 and/or in various local caches on the computing devices of the user's friends, such computing devices shown generally at 114.

It is to be appreciated and understood that while the computing devices in the FIG. 1 example are illustrated as desktop devices, such devices can take other forms such as laptop or notebook computers, handheld computers, or any other type of computing device that can be used in connection with instant messaging functionality.

Exemplary Resource Locator

In the illustrated and described embodiment, the user can utilize a unique resource locator or URL, and can associate the unique resource locator with their user-published content. Accordingly, the URL is redefined, in a sense, to reference an individual's or user's content and what that content is. This resource locator is resolvable to multiple different locations at which their published content can reside, as indicated in the illustration. By using a unique, multiple location-resolvable resource locator, the user can publish their content to their friends in an easy and straightforward manner, as will become apparent below.

In one embodiment, the resource locator is an Internet-compatible, universal naming scheme for addressing and enumerating data or information based on people or individuals. In the context of this document, an "individual" can include, by way of example and not limitation, a person, a group of persons, and/or an entity such as a company or corporation. In at least one embodiment, the resource locator has multiple parts. As but one non-limiting example of such a resource locator, consider the following.

In one embodiment, a first part of the resource locator constitutes a universal prefix. This prefix is used as an identifier to identify the scheme of which the resource locator is a part. In addition, the prefix allows the resource locator to be resolved by either a client or a server. An example of a first part of the resource locator might be "friendcast.msn.com".

In one embodiment, a second part of the resource locator is associated with or defines an endpoint. This part of the resource locator identifies or specifies whose data the resource locator represents. An example of this part is "dangw@msn.com". Hence, the data or information with which the resource locator is associated belongs to or is associated with an individual whose alias is "dangw". Optionally, this part of the resource locator can also be associated with a specific machine or computing device. In this case, this part of the identifier might look like: "dangw@msn.com@home", where the "home" portion identifies a particular machine or computing device.

In one embodiment, a third part of the resource locator is associated with what is referred to as an application namespace. This part of the identifier represents or identifies an application with which the requested data or information is associated. There can be several different types of applications. For example, applications such as MyPictures or MyCalendar can be associated with a user's pictures or calendar information respectively. In this case, this part of the locator might look like "My%20Pictures".

In one embodiment, a fourth part of the resource locator is associated with application-specific data or information that is associated with the application referenced by the third part of the resource locator. In this particular example, if the third part of the resource locator is "MyPictures", then an exemplary fourth part might look like: "/Hawaii/img01.jpg". Hence, in this example, the fourth part would reference a JPG image (img01) presumably taken in Hawaii.

Putting all of the parts of the exemplary resource locator together, one would have the following:

"http://friendcast.msn.com/dangw@msn.com@home/MyPictures/Hawaii/img01.j pg".

In the illustrated and described embodiment, and as will become apparent below, this resource locator can be placed into a browser, an RSS reader or any other Internet-enabled application and subsequently routed and resolved as described below.

In one embodiment, the endpoint part of the resource locator can be encoded so that it does not identify an individual or a specific machine. For example, in the resource locator above, the endpoint "dangw@msn.com@home" may be encoded and take the form "CID@GUID", where CID (which maps to "dangw@msn.com") and GUID (which maps to "@home") are unique strings that are mappable to the specific endpoint reference that names an individual and, optionally, a specific computing device.

Further, in another embodiment, the resource locator may include a session GUID that uniquely identifies a particular session which is referenced by the resource locator. In the above example, the session identifier might be prepended to the resource locator. This would be used, for example, in situations where two individual users are participating in a session-associated activity, such as playing a game that is referenced by the session identifier. Such can be the case, for example, where one user publishes a new chess game to his friends. Specifically, by sending a link in the form of a resource locator that identifies the chess game to a friend, the user can initiate a game of chess that is identified by the session identifier. This way, the user can participate in multiple different games of chess without the risk of a collision between the games. One way in which this type of interaction can take place is described below in more detail.

Using the Resource Locator

A resource locator, such as the one described above, can be used to associate resources or information, such as published content, with different resolvable locations. This can enable individuals to publish their information to their friends and others in a very powerful, yet simple way. The discussion below starts first with an explanation of how one can utilize the resource locator to make this association, and then follows with an explanation of how one can consume user-published content using the resource locator.

Publishing Content Using the Resource Locator

FIG. 2 is a flow diagram that describes steps in a method in accordance with one embodiment. The method can be implemented in connection with any suitable hardware, software, firmware or combination thereof. In but one embodiment, the method can be implemented using an application that executes on a user's computing device.

Step 200 defines a resource locator that is resolvable to multiple different locations. This step can be implemented by, for example, a software application that presents the user with a user interface through which they can define the resource locator. The multiple different locations can correspond to locations at which information, such as user-published or publishable content resides or can reside. For example, a user can keep their published content on their local computing device in a particular directory. Additionally, the user may maintain some of their published content on a remote server that is accessible through the Internet. Alternately or additionally, the user may have some of their published content already present on one or more of their friends' computing devices. In at least some embodiments, the resource locator is resolvable using a presence-based network, such as one that supports presence-based applications like instant messaging applications.

Step 202 associates the resource locator with information, such as the user's published content, which can be located at the multiple different locations. This step can be performed as part of the definition step mentioned above. For example, in the example above, the resource locator includes a first part that defines a universal prefix which is resolvable by a client or a server, and a second part that defines a user and, optionally, a computing device. The resource locator also refers to an application namespace (the third part) and application-specific data or information (which, in this example, is the user-published content). In this case, this step is performed by providing the last two parts of the resource locator described above.

Accordingly, once the user has created their content, defining a resource locator and associating it with their content makes this content easily available to their friends and others. In addition, as will become apparent below, in at least some embodiments, any updates to a user's published content can be quickly and simply conveyed to their friends without any intervention by the user who created the content.

It is to be appreciated and understood that the user's published content can be published on their local machine and/or optionally pushed to a server cache.

Consuming Content Using the Resource Locator

FIG. 3 is a flow diagram that describes steps in a content consumption method in accordance with one embodiment. The method can be implemented in connection with any suitable hardware, software, firmware or combination thereof. In but one embodiment, the method can be implemented using an application that executes on a user's computing device.

Step 300 generates a request for information, such as user-published content, represented by a resource locator. This step can be performed on a user's local machine or device by, for example, providing a resource locator, such as the one described above, to a suitably configured application, such as a browser or RSS reader. In the illustrated and described embodiment, the request can be an HTTP request.

Step 302 intercepts the request. This step can be performed by any suitably configured component or application. For example, this step can be performed by a suitably configured handler component which may or may not comprise part of an instant messaging application. In the illustrated and described embodiments, interception takes place locally.

Step 304 attempts to resolve the request, on the local machine or device, using a presence-based network. In the illustrated example, the presence-based network can comprise one that is utilized by an instant messaging application. This step can be performed in any suitable way. For example, as part of implementing this step, the intercepting component can check and ascertain whether a friend or user with which the request is associated is on-line and whether there is a peer-to-peer connection established with this friend and the friend's remote device. That is, this friend may appear on the user's buddy list and if so, the presence-based network can easily ascertain if this friend is on-line. If there is a peer-to-peer connection established with this friend, then the request can be resolved using the peer-to-peer connection.

If, on the other hand, this request cannot be resolved using the presence-based network, step 306 can optionally attempt to resolve the request using a local cache. For example, the information that is the subject of the request may have been previously cached on the user's local device. If this is the case, then the request might be resolved by resort to the local cache. Of course, it is to be appreciated and understood that this step can occur before step 304.

Alternately or additionally, if the request cannot be resolved using the presence-based network, then step 308 can attempt to resolve the request through a remote server. That is, the information or content with which the request is associated (or a form thereof) may also be maintained on a remote server or accessible through a remote server. In this case, the method can attempt to resolve the request using the remote server. For example, the information or content may be content that belongs to a friend of a friend. For example, if users A, B and C are friends, user A might be able to get user B's content from user C's cache. In this example, the remote server can facilitate acquisition of the content by, for example, ascertaining whether the requested content resides in its cache and/or attempting to establish a peer-to-peer connection between user A and user C.

Figure 4:
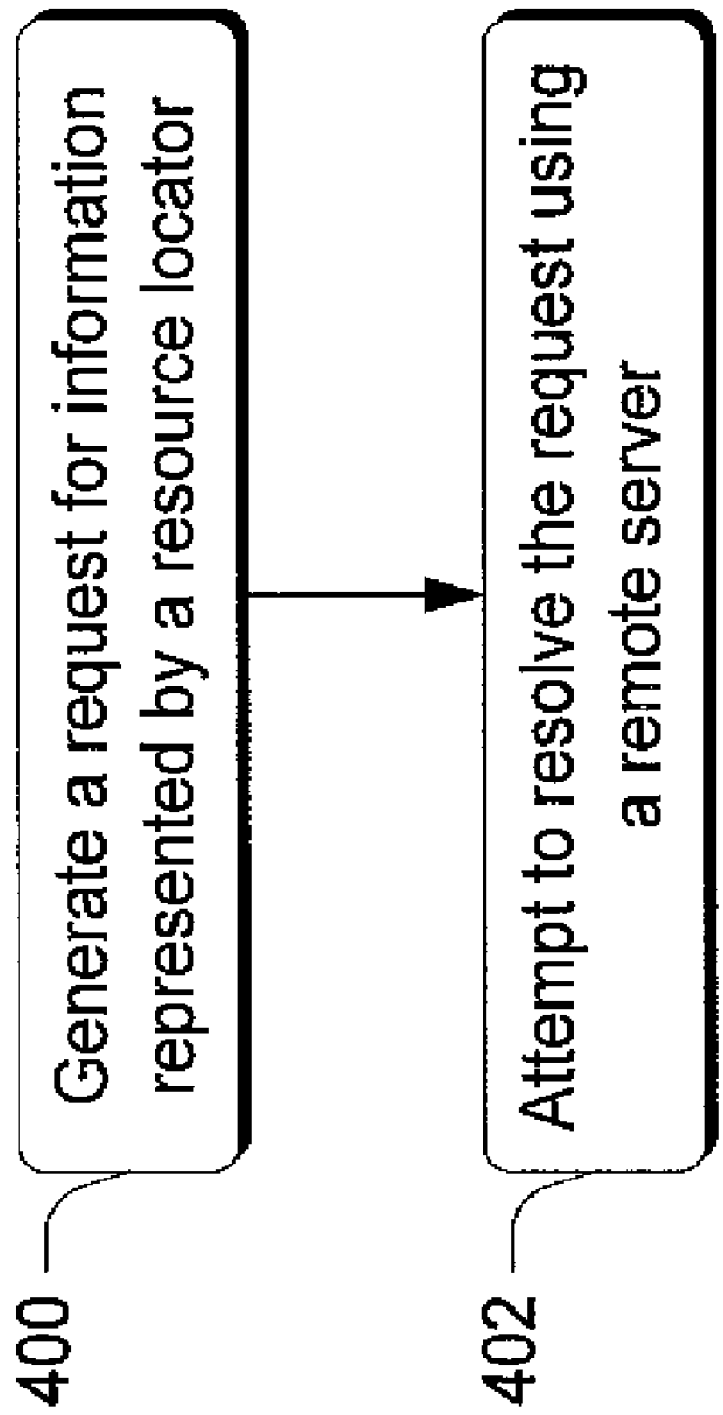
FIG. 4 is a flow diagram that describes steps in a method in accordance with one embodiment.

FIG. 4 is a flow diagram that describes steps in another content consumption method in accordance with one embodiment. The method can be implemented in connection with any suitable hardware, software, firmware or combination thereof. In but one embodiment, the method can be implemented using an application that executes on a user's computing device.

Step 400 generates, on a local device, a request for information represented by a resource locator having an endpoint. Examples of resource locators are given above. In this particular embodiment, the resource locator is resolvable by an appropriately configured application via a presence-based network using a peer-to-peer connection, or through a remote server that does not use a peer-to-peer connection. In this example, the application can comprise any suitably-configured application, such as an instant messaging application.

If the local device does not have the application, or if the peer-to-peer connection does not exist with a computing device associated with the endpoint, step 402 attempts to resolve the request using a remote server. Alternately, if the local device has the application or if the peer-to-peer connection does exist, the request can be attempted to be resolved using the application or the peer-to-peer connection as described above.

In an event that the local device does not have the suitably configured application, the remote server can invite the user to install the application. That is, responsive to attempting to resolve the request, the server may prompt the user to install the application. The user can then opt to install the application and proceed to attempt to have the request resolved.

If the user's request is associated with a user that does not appear on their buddy list, then the server can send the user originating the request a communication asking whether the request-originating user wishes to invite the user associated with the endpoint to join the request-originating user's buddy list. If the request-originating user sends an invitation and the invitation is accepted, then the request can be attempted to be resolved using a peer-to-peer connection between these users.

In this instance, an original request which may not have had the appropriate application to complete the request, or which did not have the appropriate permissions (as by being associated with a buddy that appears on the request-originating user's buddy list) is nonetheless capable of being resolved by performing a couple of different actions: installing the application and/or adding the endpoint-associated user to the appropriate buddy list.

End User Scenarios

The above-described embodiments can be used in various routing, resolution, syndication and consumption scenarios. The following examples are provided to give the reader a tangible idea of how the various embodiments can be employed. The examples are not intended to limit application of the claimed subject matter.

With regard to routing and resolution, consider the following. When a resource locator such as that describe above is requested, a component, such as an http server, installed on the client can intercept and resolve the request. This client component can route the request as appropriate. For example, it can redirect the request to a server, satisfy the request with a locally cached response, or tunnel the request through a peer-to-peer transport directly to the owner of the data as described above. If the local http server is not installed, the local system will naturally direct the request to the appropriate server which can either satisfy the request or install the client component as described above.

With regard to syndication, consider the following. When the request is routed to the publisher of the content, a registered handler installed on the publisher's computing device can satisfy the request. The handler can map the resource locator to a hard drive location and return either a file as is, or a folder as an RSS feed. In the case where the resource locator includes a search parameter, a desktop search application, such as Windows® Desktop Search can run on the publisher's machine to generate an RSS search response. The RSS feed can also contain an XSLT reference to format the data to HTML for browsers. If the request was a WebDAV request, the response can be formatted as XML that is used by the client to give a file system experience.

With regard to consumption of content, consider the following. Since the address is a resource locator or URL and the protocol being used is HTTP, any web-enabled application can consume the data. For example, the data could be HTML, XML, RSS, or binary files like JPEG. In some cases a richer set of verbs is possible, such as those provided by WebDAV, as will be appreciated by the skilled artisan. In a browser the HTML can be a web application just like conventional servers provide. Most things that can be done with HTTP can now be done in a friend-to-friend manner, without the complications of setting up a server. Widgets (or Gadgets) could be simple RSS readers subscribed to a friend's URLS.

In addition, when a resource locator is resolved, at least some embodiments can aggregate lists of information from different locations and present those aggregated lists to a user. For example, a user may have some of their published content at a remote server and other of their published content on their local device. If this is the case, and a request for this data is received, the list that is returned to the requester can contain an aggregation of the content at both locations.

With regard to security, consider the following. When an HTTP request is intercepted locally, the request can be routed and transformed through the appropriate permissions and security. Although the local client is issuing plain text HTTP requests, the data that leaves and enters the machine can be restricted via ABCH and encrypted via a passport.

Figure 5:
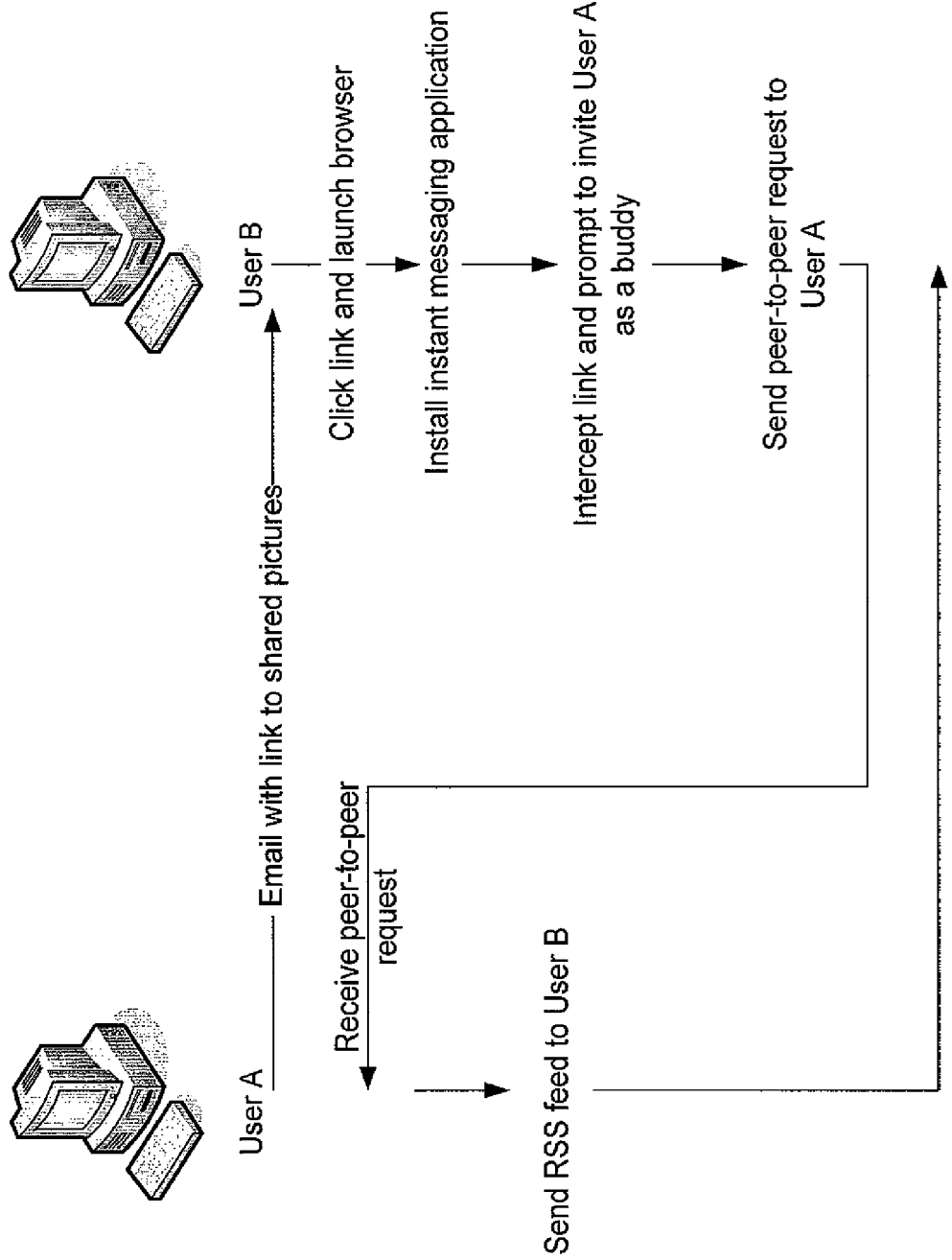
FIG. 5 is a high level overview of a walk through of one example of how various embodiments can be employed.

FIG. 5 illustrates a walkthrough that shows an end to end scenario in an instant messaging application in the form of Windows® Live Messenger. Here, permissions are enforced through the buddy list and encryption is through the secure peer-to-peer transport. In this example, since the Messenger code base is invoked, it can provide security prompts and enforcement without the client application being aware. Security is applied at both ends of the communication ensuring that only mutually verified criteria will allow a transaction to complete.

In FIG. 5, there are two users—User A and User B. User A wishes to share his pictures with User B. Initially, User A, using an instant messaging application, sends an e-mail to user B, as indicated in FIG. 5, containing a link to his shared pictures. This link might assume the form:

<a href="http://friendcast.msn.com/a@msn.com/Shared%20Pictures">click here</a>

User B, who is not an instant messaging application user, clicks the link which launches her browser and takes her to the friendcast.msn.com server which up sells her to install MSN Messenger.

After User B installs Messenger, the link is intercepted by the Messenger client and User B is prompted to invite User A as a buddy. That is, in this example, the response is a page asking her if she'd like to invite User A as a buddy.

After User B has User A as a buddy, the link will cause Messenger to send a peer-to-peer request to User A. User A's Messenger client receives the request from User B, validates her permissions, and generates an RSS file where each item is either a folder with a FriendCast link to the folder, or a file with an enclosure link to the file. The feed is sent back to User B's machine.

User B's browser can now render the RSS file with an applied XSLT to present a pleasing HTML view. User B can look at the files and folders and click on them to browse or download. User B can type, for example, 'vacation' into the search field of the rendered page. This, in turn, navigates the browser to the link "http://friendcast.msn.com/a@msn.com/Shared%20Pictures?search=vacation", which is routed to User A.

User A's client handles the request by creating an RSS response from the files found using a search program, such as Desktop Search. User B sees the search results and clicks on an 'RSS' button on the page. Her registered RSS reader is launched and the search results are shown as items in a feed.

Now, assume that User A downloads new photos from his camera and tags them with the 'vacation' category using his favorite photo management tool. User B's RSS reader can poll the URL and show the new photos within moments of their availability. User B is now richly subscribed to User A's photos and User A needs to take no explicit action for new photos to be available to User B after copying the photos off his camera.

If, in the example above, the initial link from User A was presented by an RSS reader instead of a browser, then the up sell and add the buddy prompts would have shown up as RSS items.

MORE EXAMPLES

As one can surely appreciate, there are simply enumerable user scenarios that are made possible using the above-described embodiments. As for some further non-limiting examples, consider the following.

Using the above-described approach, a link on an MSN Space photo, for example, could fetch a full resolution photo using a peer-to-peer connection, or a medium resolution photo from a server. If both buddies are online at the same time, the Spaces server would be spared the throughput cost. Also, if the photo is no longer on the server and if not peer-to-peer system is in place, the server can fetch the photo, store it and then satisfy the request.

A browser application, such as Internet Explorer® 7, can automatically download calendar appointments in an RSS feed and place them in an overlaid calendar in Outlook®. A calendar handler can automatically publish someone's Outlook® calendar to their friends using the techniques described above. Accordingly, within minutes of creating an appointment, a user's friends would be able to see the appointment.

Additionally, a user can record a daily thought to an audio file, save it to their hard drive, and within moments, that file is placed on their friends' media devices by their media casting RSS reader.

As another example, a user can save their comments (blog) in a text file to their hard drive. The system can then automatically syndicate from the local drive content in an RSS format.

As further examples, consider the following.

One content type that can be published is an HTML page with JavaScript that is an AJAX application. The code runs locally and it can make requests that causes the code to run remotely. As an example, the AJAX application might a implement a game—such as a game of chess that could operate as follows. User A receives a link from user B to an instance of a game of chess in the form of an HTML application. User A's browser runs the application that makes the requests to User B to get the state of the game then to render it and enforce rules. When user A makes a move it generates a request to user B. User B's application executes and store the move, and then updates both users to the new state. When user B makes a move, the request is handled locally to execute and store the move and then update both users to the new state. All requests in this scenario reside in the form of an URL, such as those described above.

Further, the content can be an application that resides at the location. One example of this is content that is an HTML page that invokes remove verbs by use of a URL with GET or PUT parameters. For example, a media center personal computer can publish an HTML page with links that get routed to the media center personal computer and cause it to take actions such as setup a recording or delete a recording. Alternately or additionally, the media center personal computer can expose these verbs as a SOAP API thus allowing two media center personal computers to discover and communicate with each other exchanging verbs and content.

As but another example, a request on a down-level device can get routed to a server which then routes the request to another location or locations. This request could go to the server since a local handler might not exist. The server can then proxy the request to one or more local machines through a presence network. For example, a user can navigate to a URL on their web-enabled phone to search their home computer and other computers for a document, and then tell the computer(s) to e-mail the document to their work e-mail account. The request goes to the server then the server routes the request to the user's computer(s). The computer(s) return the search results to the server which can then aggregate results and transform them to a phone-consumable format. Links then can invoke verbs, routed similarly, that tell the computer(s) to send the e-mail.

Conclusion

The methods and systems described above provide simple syndication, browsing, searching, and subscribing solutions to networks of friends. In at least some embodiments, the approaches utilize standard HTTP protocols for consumption, subscription, and interaction of data while using the local file system for publication. The inventive approach overlays a URL address space that can be handled and routed interchangeably between multiple clients and servers or "locations". In this manner, generated requests for user published content can be satisfied by local caches, servers, or peers through, for example, a peer-to-peer network. Accordingly, the inventive solutions provide a platform to make this possible with a simple publishing model that is fully compatible with existing Internet enabled applications.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
    defining a resource locator that is resolvable to multiple different locations, the resource locator being based on a request for information, on a local device, published by at least one individual, wherein the resource locator comprises:
        a first part comprising a universal prefix to identify a scheme of which the resource locator is a part;
        a second part defining an endpoint to identify the at least one individual;
        a third part associated with an application namespace to identify an application with which the information is associated; and
        a fourth part which pertains to application-specific information that is associated with the application referenced by the third part of the resource locator;
        a session GUID that identifies and is unique to a particular session of at least the local device;
    intercepting the request on the local device;
    first, attempting to resolve the request on a local cache on the local device;
    second, if the first act of attempting fails, attempting to resolve the request using a presence-based network; and
    third, if the second act of attempting fails, attempting to resolve the request using a remote server.

2. The method of claim 1, wherein the remote server is an Internet-accessible server.

3. The method of claim 1, wherein the presence-based network is an instant messaging application.

4. The method of claim 1, wherein the endpoint is associated with the individual.

5. The method of claim 1, wherein the endpoint is associated with the individual and a specific computing device.

6. A computer-implemented method comprising:
generating, on a local device, a request for information, wherein the request is represented by a resource locator comprising an endpoint, wherein the resource locator further comprises:
- a first part comprising a universal prefix to identify a scheme of which the resource locator is a part;
- a second part, located immediately subsequent to the first part, defining the endpoint to identify the at least one individual;
- a third part, located immediately subsequent to the second part, associated with an application namespace to identify an application with which the information is associated;
- a fourth part, located immediately subsequent to the third part, which pertains to application-specific information that is associated with the application referenced by the third part of the resource locator;
- a session GUID that identifies and is unique to a particular session established between a user of the local device and a user associated with the endpoint;

intercepting the request on the local device;
first, attempting to resolve the request using a presence-based network;
second, if the first act of attempting fails, attempting to resolve the request on a local cache on the local device;
third, if the second act of attempting fails, attempting to resolve the request through a remote server; and
participating in multiple session-associated activities, by the local device, with the user associated with the endpoint while avoiding collision between the multiple session-associated activities by employing the sessions GUID to uniquely identify each session associated activity.

7. The method of claim 6, wherein if the first act of attempting succeeds, satisfying the request using a peer-to-peer connection between the local device and a remote device.

8. The method of claim 6, wherein if the first act of attempting succeeds, satisfying the request using a peer-to-peer connection between the local device and a remote device, wherein the remote device is associated with an individual who appears on a buddy list of a user of the local device.

9. The method of claim 6, wherein the act of intercepting is performed by an instant messaging application.

10. The method of claim 6, wherein the third act of attempting encodes the resource locator so that the resource locator does not disclose individual users or machines.

11. One or more computer-readable media comprising computer-readable instructions which, when executed, implement a method comprising:
generating, on a local device, a request for information, wherein the request is represented as a resource locator comprising an endpoint associated with user-published content, wherein the resource locator is resolvable by an appropriately configured application via a presence-based network using a peer-to-peer connection or through a remote server that does not utilize a peer-to-peer connection, the resource locator comprises:
- a first part comprising a universal prefix;
- a second part defining the endpoint without specifically identifying an individual or a machine of the endpoint;
- a third part associated with an application namespace;
- a fourth part which pertains to application-specific information;
- a session GUID that identifies and is unique to a particular session of at least the local device;

intercepting the request on the local device;
first, attempting to resolve the request on a local cache on the local device;
second, if the first act of attempting fails, attempting to resolve the request using a presence-based network; and
third, if the second act of attempting fails, attempting to resolve the request using the remote server.

12. The computer-readable media of claim 11, wherein the method further comprises receiving, as a result of the act of attempting, an invitation to install the application.

13. The computer-readable media of claim 11, wherein the method further comprises receiving, as a result of the act of attempting, a communication asking whether a user of the local device wishes to invite a user associated with the endpoint to join a local device user's buddy list.

14. The computer-readable media of claim 11, wherein the resource locator can be resolved in a manner in which lists of information from different locations can be aggregated and returned to a user of the local device.

* * * * *